(12) United States Patent
Ota

(10) Patent No.: US 7,717,107 B2
(45) Date of Patent: May 18, 2010

(54) SMOKELESS COOKER

(75) Inventor: Masuo Ota, Sapporo (JP)

(73) Assignee: Shinpo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/949,041

(22) Filed: Dec. 2, 2007

(65) Prior Publication Data

US 2008/0202492 A1 Aug. 28, 2008

Related U.S. Application Data

(63) Continuation of application No. 11/383,959, filed on May 18, 2006, now abandoned, which is a continuation of application No. PCT/JP2004/017067, filed on Nov. 17, 2004.

(30) Foreign Application Priority Data

Nov. 18, 2003 (JP) .............................. 2003-388387

(51) Int. Cl.
  *A47J 37/06* (2006.01)
(52) U.S. Cl. .............................. 126/299 D; 126/299 R; 108/50.13
(58) Field of Classification Search ............. 126/299 D, 126/299 R; 55/DIG. 36; 108/50.13
  See application file for complete search history.

(56) References Cited

U.S. PATENT DOCUMENTS 4,350,504 A * 9/1982 Diachuk .................. 126/299 F
4,432,274 A * 2/1984 Kurotaki .................. 99/400
4,648,378 A * 3/1987 Nishikawa ............... 126/21 A
4,962,694 A * 10/1990 Graver ...................... 126/300
6,344,074 B1 * 2/2002 Ward et al. ............... 126/299 D

FOREIGN PATENT DOCUMENTS

| JP | 56-100240 | * | 8/1981 |
| JP | 05-329059 | * | 12/1993 |
| JP | 07-318128 | * | 12/1995 |
| JP | 09-28584 | * | 2/1997 |
| JP | 09-135779 | * | 5/1997 |
| JP | 10-272063 | * | 10/1998 |
| JP | 2000-70759 | * | 3/2000 |
| JP | 2000-116530 | * | 4/2000 |
| JP | 2001-245794 | * | 9/2001 |
| JP | 2002-095593 | * | 2/2002 |
| JP | 2003-33278 | * | 2/2003 |

* cited by examiner

*Primary Examiner*—Carl D Price
(74) *Attorney, Agent, or Firm*—Hiroe & Associates; Taras P. Bemko

(57) ABSTRACT

A smokeless cooker includes a table located indoors, with a cabinet, which may include a plurality of individual boxes stacked and assembled together, below the table. A gas-discharge flow path leads from the cabinet to the outdoors. The cabinet includes an inner box with an open upper portion in an upper opening section of an outer box. An installed cooking means is located inside the inner box. A suction flow path is formed outside the inner box, with a suction hole in the inner wall of the suction flow path above a heating surface of the installed cooking means. The gas-discharge flow path includes a fat/oil filtering section, an absorption deodorizing section, a HEPA filter and a fan. A duct leading to the outdoors is present at the downstream side of the HEPA filter.

15 Claims, 8 Drawing Sheets

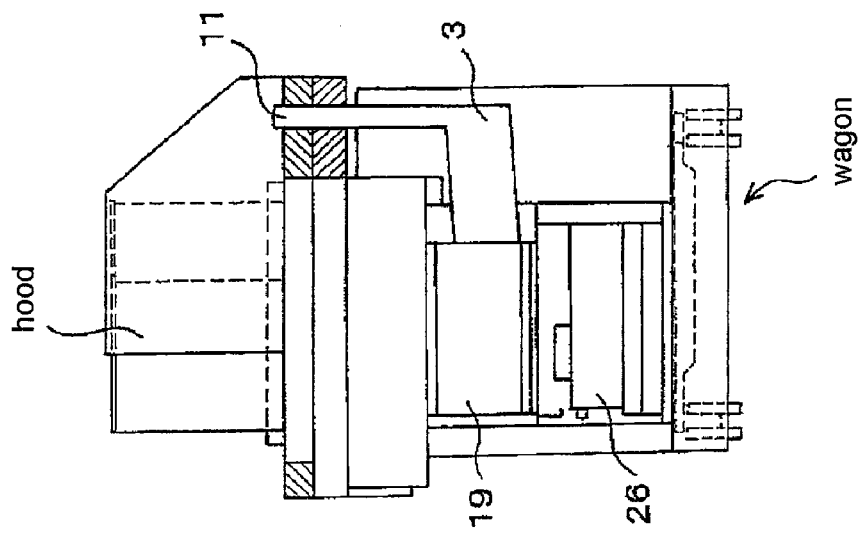
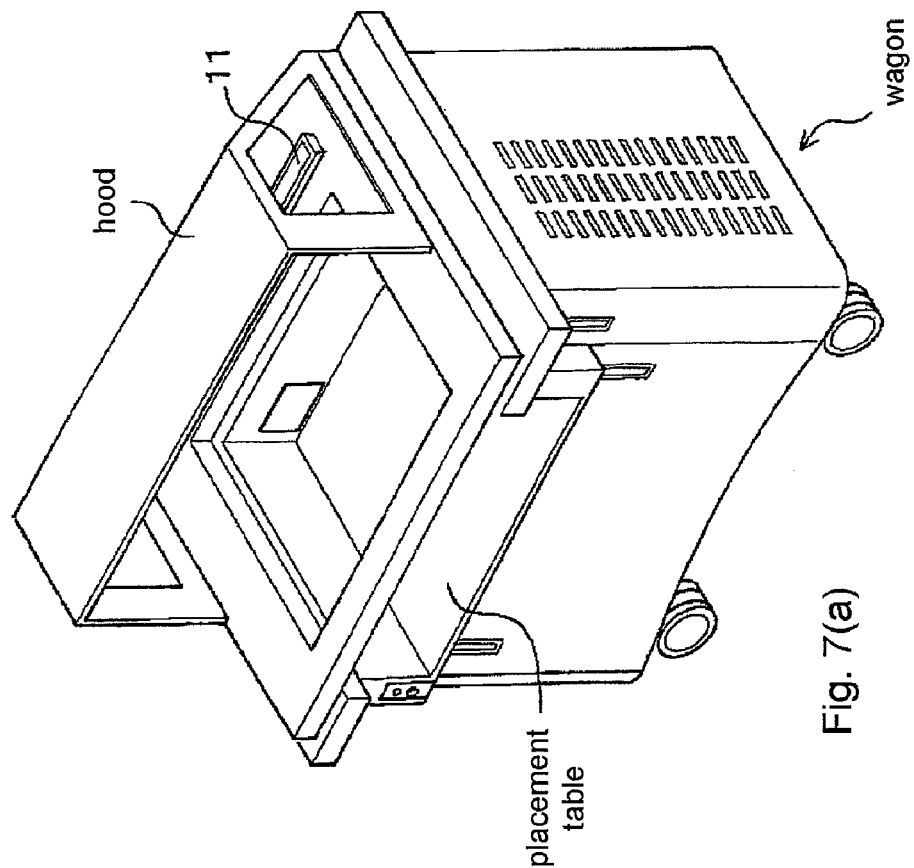

Fig. 8
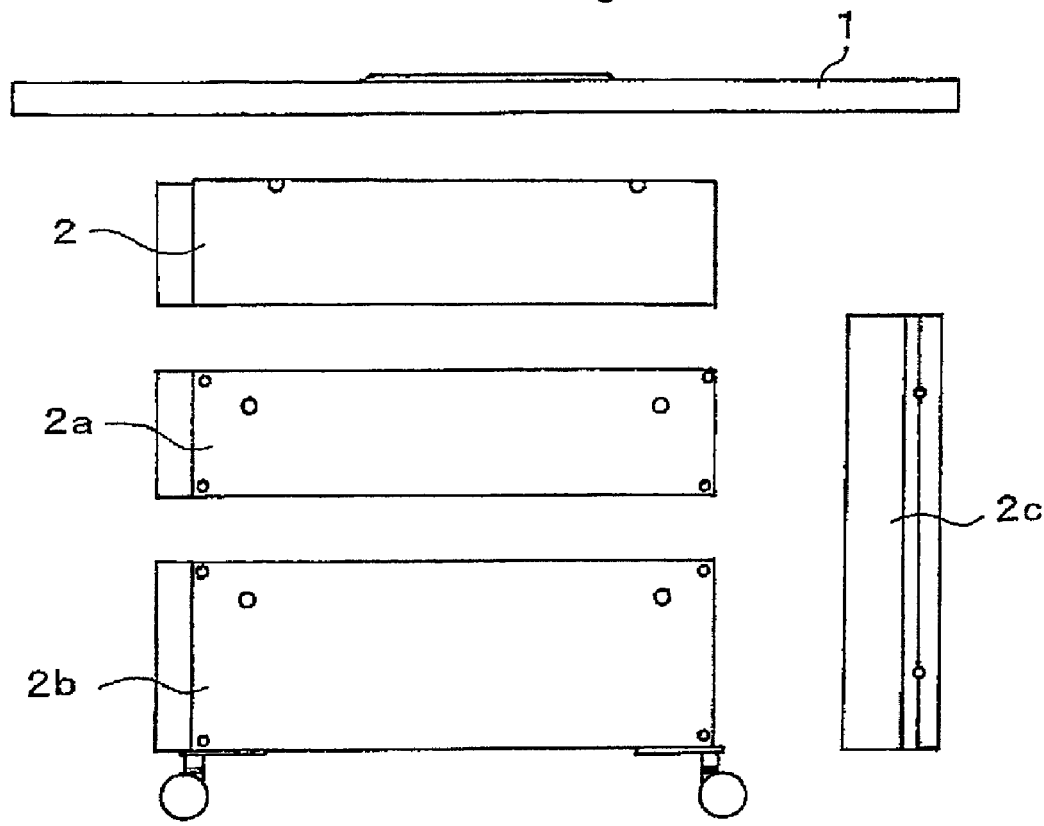
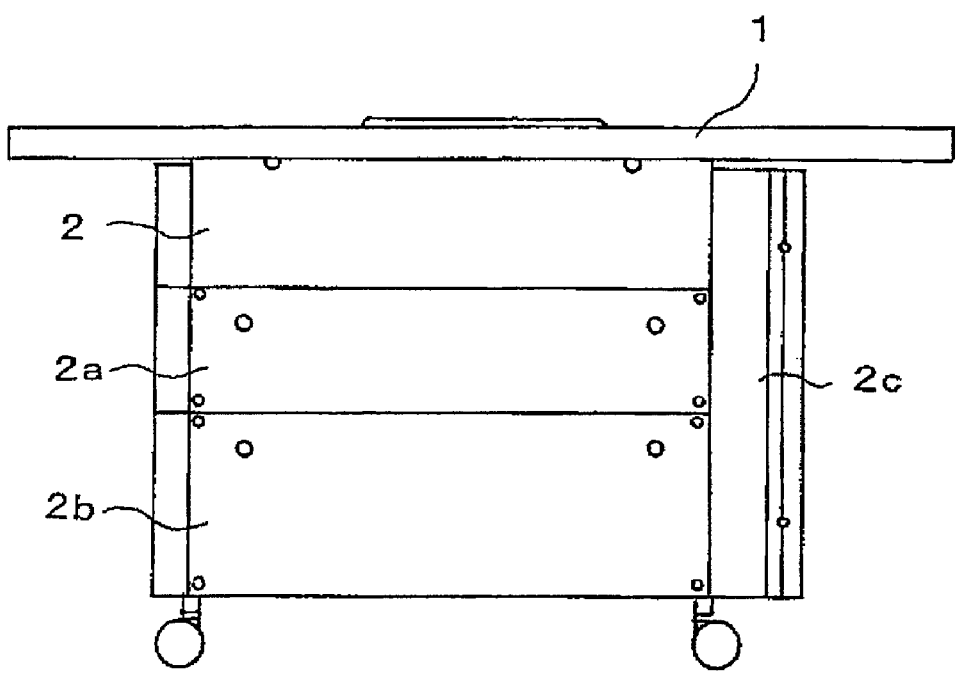
Fig. 9

SMOKELESS COOKER

CROSS-REFERENCE TO RELATED APPLICATIONS

This application is a continuation under 35 U.S.C. §120 of U.S. patent application Ser. No. 11/383,959, filed May 18, 2006 now abandoned, which is a continuation under 35 U.S.C. §120 of International Patent Application Serial Number PCT/JP2004/017067, filed Nov. 17, 2004, which claims priority based on Japanese Patent Application Serial Number 2003-388387, filed on Nov. 18, 2003.

BACKGROUND OF THE INVENTION

The invention relates generally to devices and apparatus for cooking foods. More particularly, the invention is embodied in a smokeless cooker that filters its exhaust gas through a HEPA filter.

Conventionally, in order to discharge the exhaust gas generated from a cooker disposed in a barbecue restaurant or the like to the outside, the cooker is connected to a duct, with a deodorizing unit connected at the downstream side of the duct. In general, a centralized duct system has been employed that filters oily smoke and odor out of the exhaust gas generated from plural cookers and discharges the exhaust gas to the outside.

Duct and deodorizing units of this general type require regular maintenance such as cleaning of the inside thereof and replacement of filters. However, since such maintenance requires a considerable expense, owners and operators of barbecue restaurants sometimes neglect to perform such maintenance services in a timely manner.

When such maintenance is neglected, however, a large amount of fat, oil, or the like may accumulate inside the duct and on the filters. A duct fire may happen when fire comes in contact with the accumulated fat and oil, which can catch fire inside the duct.

In addition to the above-described type connected to a duct to discharge exhaust gas to the outdoors, a non-duct type cooker of the type disclosed in Japanese Laid-Open Patent Application No. 2002-95593 has also been used. The non-duct type cooker is equipped with a drain box, a suction fan, a filter, and the like inside the cooker body to clean the exhaust gas within the cooker body and to return the cleaned exhaust gas to the room in which the cooker is located. Since the non-duct type cooker is not limited in installation position inside the restaurant by the need to connect it to a duct, the freedom of layout is thereby increased.

In the conventional non-duct type cooker, however, since the exhaust gas is not satisfactorily cleaned inside the cooker body, it is difficult to completely remove the oily smoke and odor from the exhaust gas generated from the cooker.

In the conventional non-duct type cooker, moreover, the roasting smoke sucked from the vicinity of the roasting surface in the cooking section is filtered through filters or the like to clean the smoke, and then discharged into the room (inside the restaurant) through a discharge louver provided on a side wall of a cooker cabinet. Although the exhaust gas has been cleaned, it may still be somewhat hot since it has come from the roasting surface of the cooking section. Heat generated from the cooker is therefore concentrated around the discharge louver. When the cooker is used in a restaurant, a party hall, or the like, guest seats must therefore be disposed away from the discharge louver, and the possible layout of the guest seats is thereby restricted.

SUMMARY OF THE INVENTION

The invention is embodied in a smokeless cooker that can, when discharging exhaust gas generated from the cooker outdoors or indoors, almost completely remove oily smoke and odor from the exhaust gas.

A representative embodiment includes a table located indoors, and a cabinet below the table. A gas-discharge flow path leads from the cabinet to the outdoors. The cabinet includes an inner box with an open upper portion in an upper opening section of an outer box. An installed cooking means is located inside the inner box. A suction flow path is formed outside the inner box, with a suction hole in the inner wall of the suction flow path above a heating surface of the installed cooking means. The gas-discharge flow path includes a fat/oil filtering section, an absorption deodorizing section, a HEPA filter and a fan. A duct leading to the outdoors is present at the downstream side of the HEPA filter and located either beneath or above a floor. The cleaned exhaust gases travel through this duct.

In some embodiments, the fat/oil filtering section, the absorption deodorizing section and the HEPA filter are disposed in that order in the gas-discharge flow path.

The fat/oil filtering section may include both a first filter and a second filter.

The second filter may preferably exhibit a collection ratio of 95% or more.

The second filter may advantageously be a ULPA filter.

The installed cooking means may include a gas burner, an IH heater, or an electric heater with a resistive heating element.

Some embodiments may be in the form of a separable smokeless cooker that includes a table and a plurality of boxes assembled below the table, in which the inside of each of the boxes is arranged as a flow path section and in which neighboring flow path sections are connected to each other to form a gas-discharge flow path. An inner box with an open upper portion may be located in an upper opening section of an outer box provided in an upper box located immediately below the table. A placement table configured to receive a separate cooking means can be provided within the inner box. A suction flow path in communication with the gas-discharge flow path may be formed outside of the inner box, and a suction hole in communication with the suction flow path may be formed above a heating surface of the cooking means installed on the placement table. A fat/oil filtering section, absorption deodorizing section, a HEPA filter, a fan, and an exhaust opening can be disposed within the gas-discharge flow path.

Some embodiment will include a plurality of separate boxes stacked and assembled together below the table, with a separate side box located at the side of the stack. A HEPA filter can be located inside the side box with an exhaust opening formed in a side face of the side box and a supply port communicating between the side box and the uppermost box in the plurality of stacked boxes below the table.

In an embodiment such as this, a part of the exhaust gas sent through the supplying opening is used for burning fuel gas with a gas burner.

Exhaust gas may also be sent through the supplying opening to cool an IH heater, or to cool an outer wall of the uppermost of the stacked boxes in an embodiment using a resistive element.

Since the exhaust gas generated in cookers of this type is filtered through a fat/oil filtering section, an absorption deodorizing section, and a HEPA filter, oily smoke and odor are almost completely removed and cleaned to substantially the same level as that of a fresh air. Such a cooker can therefore be used even in a place where the environmental standards are strict.

Such a configuration also removes oily smoke and odor from the exhaust gas before it is sent into the duct, so that the accumulation of fat and oil within the duct can be reduced, and accordingly the duct can be prevented from catching fire.

The fat/oil filtering section, the absorption deodorizing section, and the HEPA filter are, moreover, disposed in order from the upstream side toward the downstream side according to their respective collection ratios in the filtering process so that the cooking smoke can be efficiently cleaned.

Where the fat/oil filtering section includes a first filter and a second filter, the first filter at the upstream side in the filtering process absorbs the fat and oil generated from the cooker. When the first filter is replaced with a new one or cleaned on a daily basis, the load on the second filter can be reduced, resulting in a reduction of the running cost for the smokeless cooker.

Where a second filter with a collection ratio of 95% or more is used in the fat/oil filtering section, the second filter absorbs almost all of the fat and oil included in the exhaust gas. The load on the HEPA filter disposed at the downstream side in the filtering process can thereby be reduced, and the replacement cycle for the expensive HEPA filter can thus be extended. Accordingly, the operating cost for the smokeless cooker can be further reduced.

Where an IH heater is used as an installed cooking means, relatively little oily smoke is generated even when roasting meat, for example. The replacement cycles for the filters can be thus be extended, which results in a reduction of the operating costs for the smokeless cooker.

Where a part of the cleaned exhaust gas is supplied into an upper box through a supplying opening and discharged through another exhaust opening in the upper box, exhaust heat from the cooker can be dispersed to plural points. Flexibility in arranging guest seats in a restaurant or the like where the cooker is used is thereby increased.

Where a gas burner is used as an installed cooking means and a part of the cleaned exhaust gas from the HEPA filter is sent into the inside of the cooker through a suction port, the cleaned exhaust gas can be used to combust the fuel gas. As a result, almost all of the air required for burning the fuel gas is obtained from the cleaned exhaust gas generated from the cooker. Since the exhaust gas is heated by the burning section of the cooker, exhaust gas discharged indoors imposes a load on the air conditioning in the room. When a part the cleaned exhaust gas, having passed through the HEPA filter, is sent into the cooker through the suction port, since the cleaned exhaust gas is used for burning the fuel gas, the amount of heated exhaust gas discharged into the room can be reduced, along with the amount of fresh air required from the room for combusting the fuel gas. The influence on the cost for air conditioning the room can also therefore be minimized. Moreover, since the fresh air in the room does not have to be used for combusting the fuel gas, the cooker body does not require an opening as an air intake. It is thus possible to eliminate potential problems of imperfect combustion that might otherwise occur if the fresh air intake opening were to become clogged with dust or the like.

Where an IH heater is employed as the installed cooking means and a part of the cleaned exhaust gas that has passed through the HEPA filter is sent to the inside of the cooker through a suction port, a part the cleaned exhaust gas flows through a cooling path in the vicinity of the IH heater. Since a part of the cleaned exhaust gas cools down the IH heater, the magnetic coil of the IH heater can be cooled down efficiently, which results in a reduction of the load on the IH heater.

BRIEF DESCRIPTION OF THE DRAWINGS

Preferred embodiments of the invention are described in detail below in connection with the appended drawings, in which:

FIG. 7(*a*) is a view showing a wagon capable of mounting a cooking means as a separate element, in which the wagon is viewed obliquely from above;

FIG. 7(*b*) is a view showing the interior of the wagon depicted in FIG. 7(*a*);

FIG. 8 is a view showing the separable smokeless cooker in accordance with the previous embodiments, disassembled into several constituent boxes and viewed from the side; and FIG. 9 is a view showing the separable smokeless cooker shown in FIG. 8 with the boxes assembled and coupled together, viewed from the side.

DETAILED DESCRIPTION OF PREFERRED EMBODIMENTS

Figure 1:
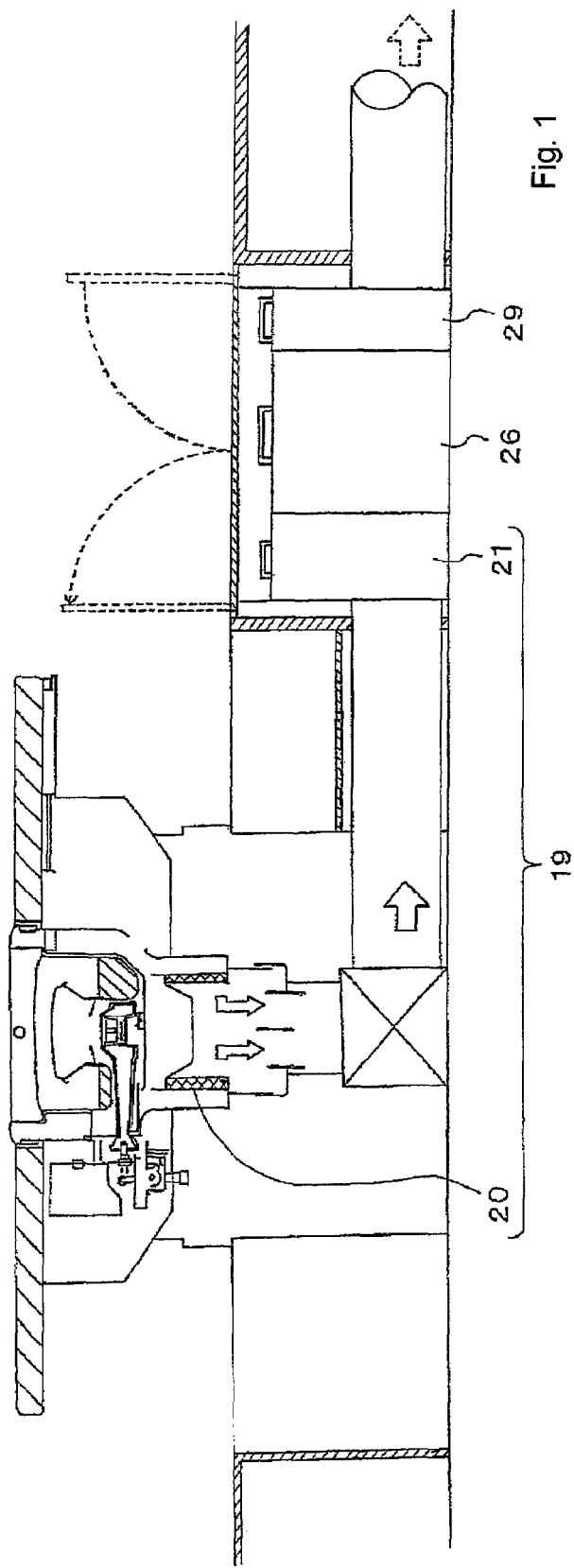
FIG. 1 is a view showing an example of a smokeless cooker that embodies the invention.

Various examples of embodiments of the invention are described in more detail below in connection with the drawing figures.

Figure 2:
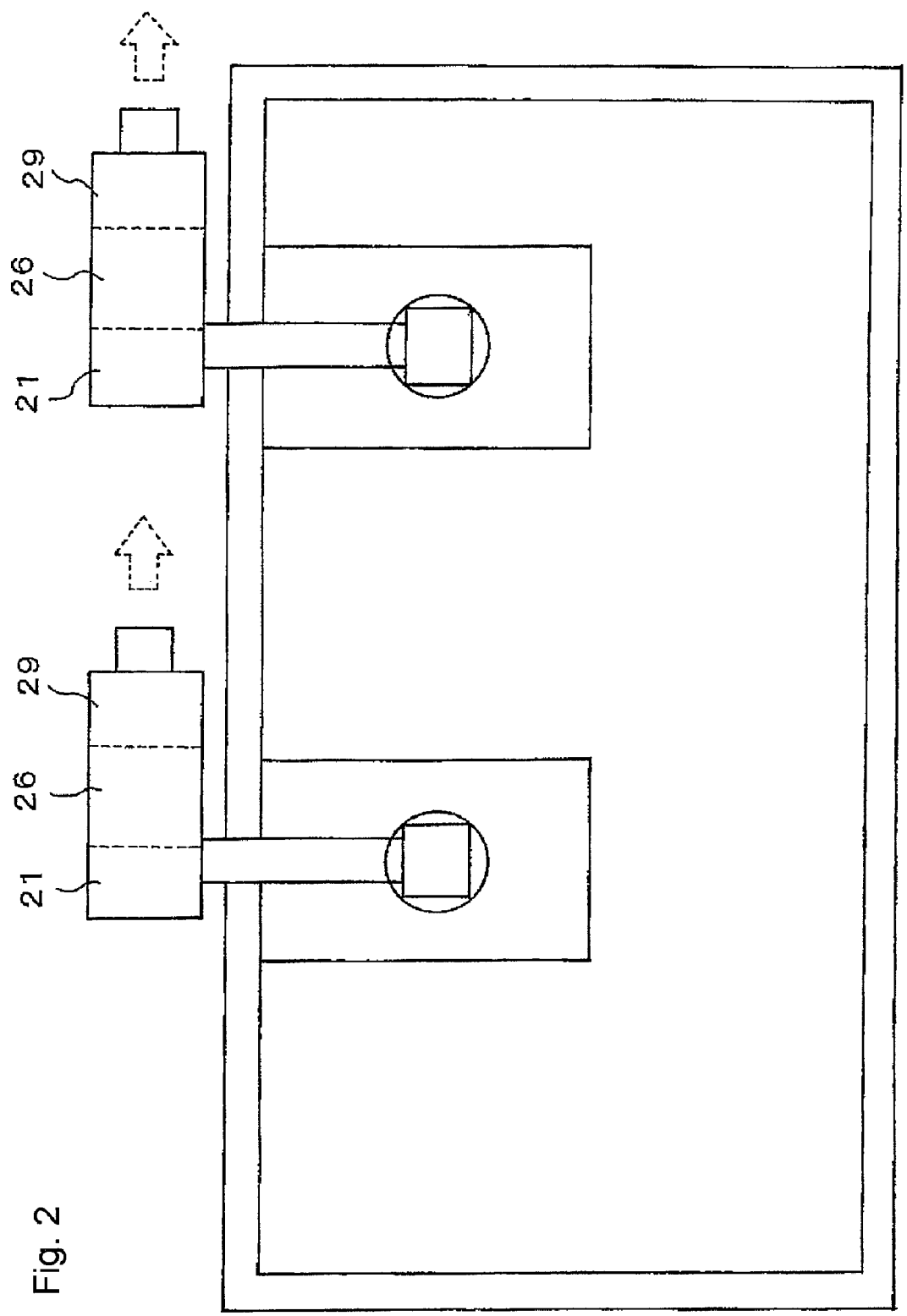
FIG. 2 is a top view showing an assembly in which each of a plurality of cookers is connected to one deodorizing unit.

FIG. 1 is a schematic section view of a smokeless cooker in accordance with a first representative embodiment. This embodiment includes a deodorizing unit including a fat/oil filtering section 19, an absorption deodorizing section 26, and a HEPA filter 29 connected to a cooker table via a duct disposed under a pit-type table. The installation location of the deodorizing unit is not, though, limited to that of the above example. For example, the deodorizing unit may be incorporated within the cooker table, embedded beneath the floor, installed behind the ceiling of a building or, as shown in FIG. 2, installed outdoors behind an outer wall partition. This invention is also not limited to constructions in which one deodorizing unit is connect to each smokeless cooker as shown in FIG. 2: a plurality of smokeless cookers may be connected to a single deodorizing unit.

The smokeless cooker in accordance with this embodiment includes, from the upstream side in the filtering process, the fat/oil filtering section 19, the absorption deodorizing section 26, and the HEPA filter 29, which are combined with each other. The odor and smoke are urged through the filtering process by means of a fan (not shown) to remove the odor and smoke. The fat/oil filtering section 19 includes a first filter 20 and a second filter 21. Active carbon is used in the absorption deodorizing section 26. Note that in FIG. 1 the first filter 20 is disposed beneath the cooker top panel.

In this embodiment the first filter 20 absorbs and removes large particles of dust and junk and thereby relieves the load on the respective filters downstream. A so-called pre-filter is used as the first filter 20. In particular, the first filter 20 can be a porous filter formed of a nickel alloy in a net-like configuration.

The second filter 21 is capable of collecting 95.0% or more of dust of 0.3μm in the atmospheric air, and is formed of a nonwoven cloth of a glass fiber or paper material. A so-called medium filter is used as the second filter 21. To ensure the collection ratio of 95% or more with the second filter, an ULPA filter (ultra low penetration air filter) is preferably employed as the second filter.

The HEPA filter (high efficiency particulate air filter) 29 is a filter capable of collecting 99% or more of dust of 0.3μm in the atmospheric air (preferably 99.90% or more, and more preferably 99.97% or more). This filter is formed of a glass fiber or paper material in a nonwoven cloth.

In this embodiment the exhaust gas generated from the cooker can be filtered through the fat/oil filtering section 19, the absorption deodorizing section 26, and the HEPA filter 29 to almost completely remove the oily smoke and odor. The exhaust is thereby cleaned to a level almost the same as fresh air.

The fat/oil filtering section 19 includes the first filter 20 and the second filter 21. The first filter 20 is located below the top panel of the cooker. The first filter 20 can thus be easily replaced with a new one while cleaning a drain pan or the like, which results in increased maintenance performance. Also, since the first filter 20 is disposed at the upstream side in the filtering process, it can absorb fat and oil generated from the cooker. By replacing the first filter 20 with a new one on a daily basis, the load on the second filter 21 can be relieved, and the operating cost for the use of the smokeless cooker can thereby be reduced.

Further, since the collection ratio of the second filter 21 in the fat/oil filtering section 19 is 95.0% or more, the second filter 21 absorbs almost all of the fat and oil contained in the exhaust gas, thereby reducing the load on the HEPA filter 29 at the downstream side in the filtering process. The replacement cycle of the expensive HEPA filter 29 is thus extended, which further reduces the operating cost for the use of the smokeless cooker.

As described above, by disposing the filters having different collection ratios from the upstream side to the downstream side in the filtering process, fat, oils, and odors can be removed efficiently and inexpensively.

Figure 3:
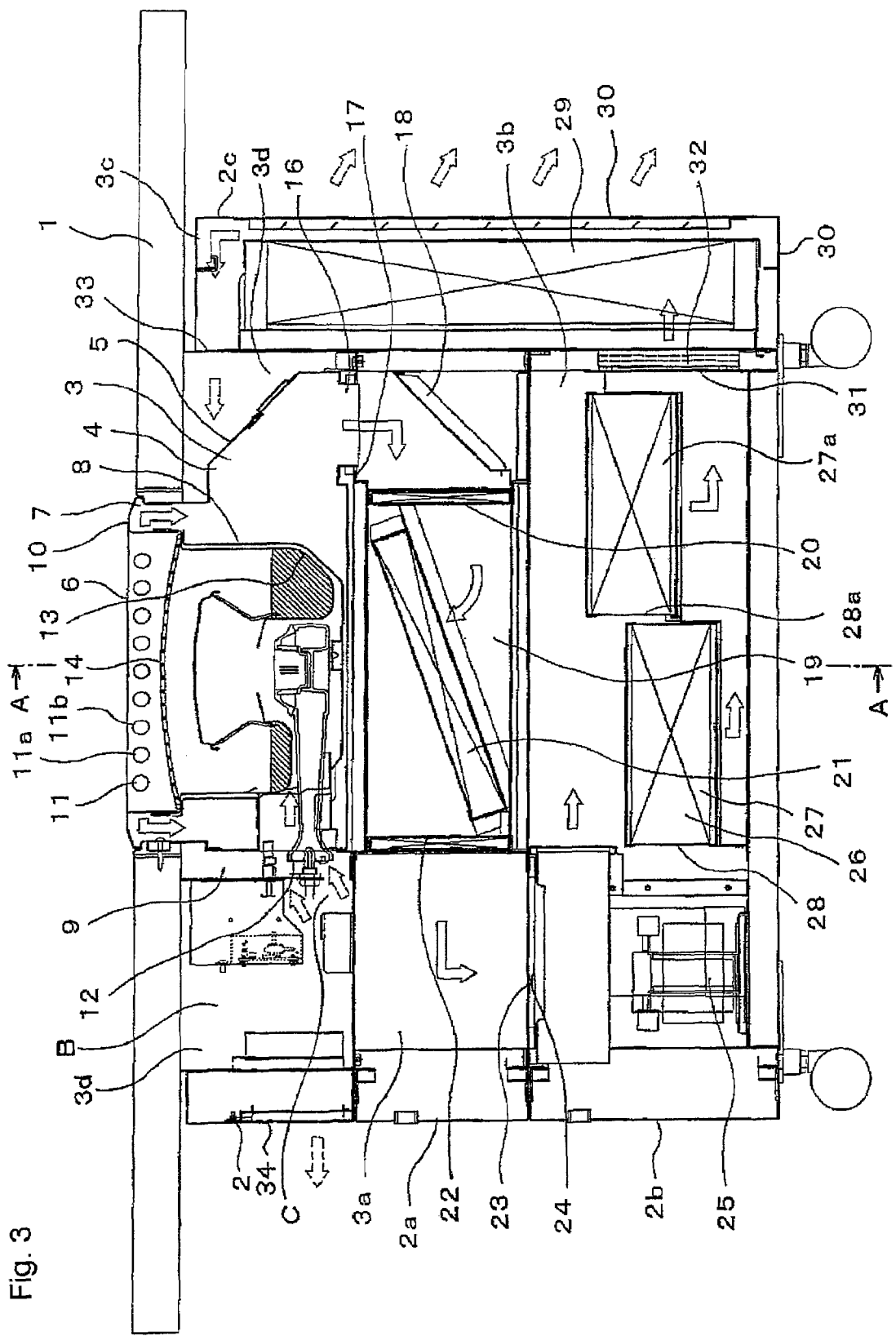
FIG. 3 is a view showing the interior of a separable smokeless cooker according to another embodiment.

FIG. 3 is a sectional view schematically showing a separable smokeless cooker in accordance with another embodiment.

The separable smokeless cooker in this embodiment employs a gas burner as a cooking means. As shown in FIGS. 8 and 9, the separable smokeless cooker comprises a table 1 (equivalent to a top panel), and a plurality of boxes 2, 2a, . . . , which are separably assembled below the table 1. Neighboring boxes 2, 2a, . . . , are connected to each other and fixed together with bolts and nuts or the like. Also, as shown in FIG. 3, the inside of the boxes 2, 2a, . . . , is arranged as flow path sections 3, 3a, . . . , with the neighboring flow path sections 3, 3a, . . . , connected to each other to form a gas-discharge flow path 4. In this embodiment the operation of the fat/oil filtering section 19 and the HEPA filter 29 are generally the same as those in the previous embodiment described above.

Below the table 1, three boxes 2, 2a, and 2b are stacked together. A side box 2c, which is taller than it is wide, is disposed separately at one side of the boxes 2, 2a, and 2b.

An outer box 5 is located inside the upper box 2. The upper portion of the outer box 5 includes an upper opening section 7, which has a diameter less than that of a corresponding opening portion 6 that is formed in the table 1.

Figure 4:
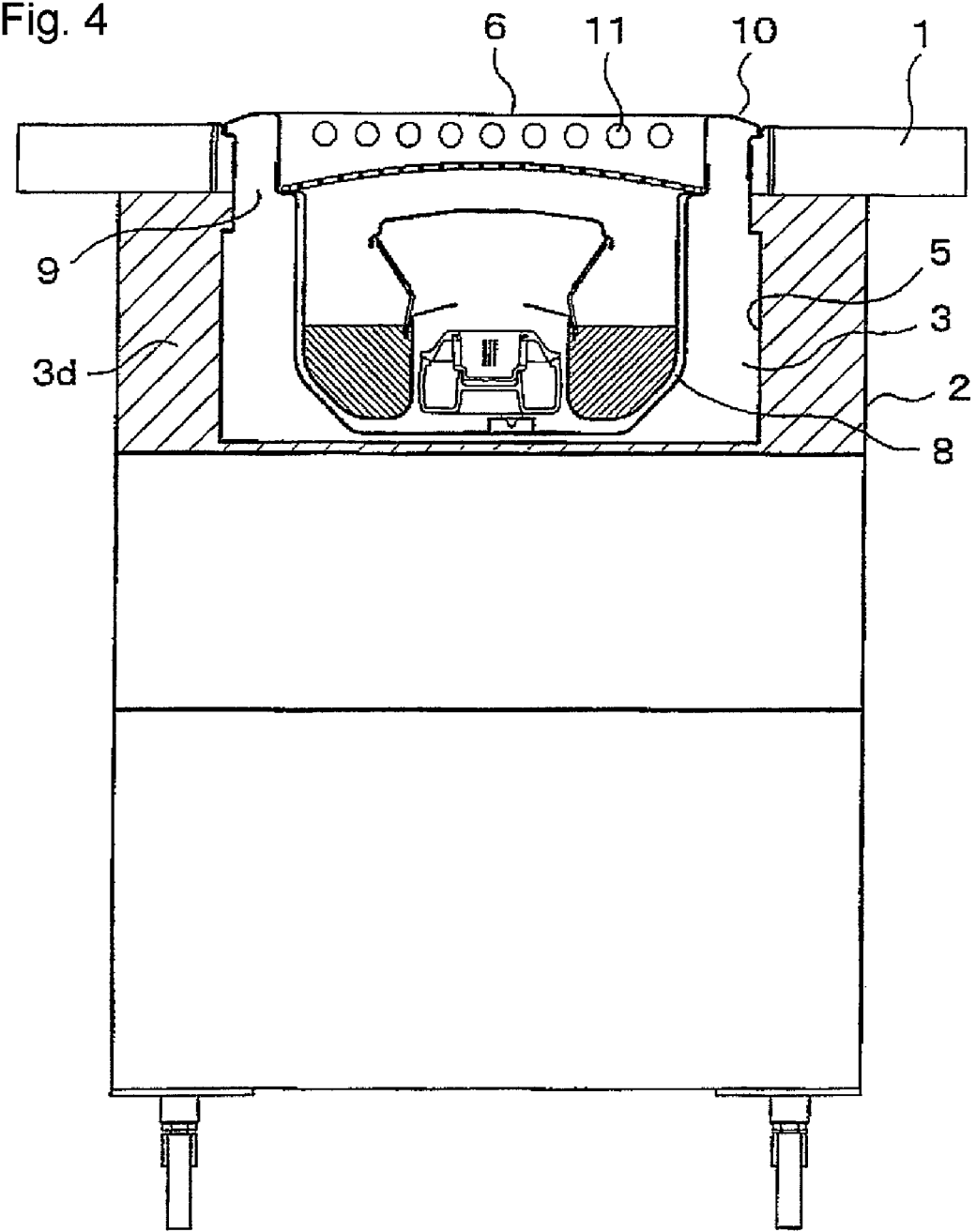
FIG. 4 is a view showing the interior of the uppermost box in the separable smokeless cooker of FIG. 3.

An inner box 8 with an open upper portion is located inside the outer box 5 below the upper opening section 7. A suction flow path 9 is formed outside the inner box 8, i.e., between the outer box 5 and the inner box 8, a suction flow path 9. The suction flow path 9 is located at the top of a gas-discharge flow path 4. That is, as shown in FIG. 4, the outer box 5 and the inner box 8 are disposed within the upper box to form a triple structure. The portion between the outer box 5 and the inner box 8 is arranged as the flow path section 3. In the figure, the shaded portion between the inner wall face of the upper box and the outer box 5 is arranged as a flow path section 3d. The roasting smoke (which has not been cleaned yet), which is drawn through the vicinity of the roasting surface of the cooking means, flows through the flow path section 3 while the exhaust gas, which is the cleaned roasting smoke, flows through the flow path section 3d.

An upper gap between the outer box 5 and the inner box 8 (suction flow path 9) is shielded with a top ring 10 with a plurality of suction holes 11, 11a, . . . , formed in the top ring 10. That is, a plurality of suction holes 11, 11a, . . . , is formed in the upper portion of the inner wall that forms the suction flow path 9 above the installed cooking means 14.

A burner 12 is provided below the inner box 8 and a drain pan 13 is integrally formed in a lower portion of the inner box 8. An installed cooking means 14 such as a grate, a grill, or the like is disposed in the upper portion of the inner box below the suction holes 11, 11a, . . . .

The inside of the intermediate box 2a is arranged as a flow path section 3a. A connecting opening 17 of a communicating opening 16 protruding downward from the lower portion of the outer box 5 is formed above one side of the flow path section 3a. An inclined panel 18 is disposed at the upstream side of the flow path section 3a below the connecting opening 17 to allow the smoke flowing from the connecting opening 17 to smoothly flow toward the fat/oil filtering section 19.

The fat/oil filtering section 19 is located inside the flow path section 3a. The fat/oil filtering section 19 includes a first filter 20 at its upstream side, a second filter 21 downstream of the first filter 20, and a de-smoke filter 22 at the downstream side of the second filter 21. The first filter 20 and the de-smoke filter 22 are mounted detachably in a rectangular frame in the intermediate box 2a. The second filter 21 is detachably mounted in an inclined state in the flow path section 3a in the intermediate box 2a.

In this embodiment, the first filter 20 is a porous filter (pre-filter) formed of a nickel alloy in a net-like configuration. The second filter 21 and the de-smoke filter 22 are ULPA filters. Note that in the present invention the fat/oil filtering section 19 is not limited to the configuration described here. For example, the first filter 20 may be used alone, the second filter 21 may be used alone, the first filter 20 and the second filter 21 may be used in combination, the second filter 21 and the de-smoke filter 22 may be used in combination; and the first filter 20 and the de-smoke filter 22 may be used in combination. Any of the above constructions or others may be employed as appropriate and desired.

The lower box 2b is arranged as a flow path section 3b. A connecting opening 24 is aligned with a communicating opening 23 from the lower portion of the intermediate box 2a above the other side of the flow path section 3b. A fan 25 is located at the upstream side of the flow path section 3b below the connecting opening 24. Smoke at the upstream side of the gas-discharge flow path 4 is thus sucked and blown out toward the downstream side.

The absorption deodorizing section 26 is disposed at the downstream side of the flow path section 3b. The absorption deodorizing section 26 includes two filters 27 and 27a disposed in parallel with each other in the flow direction. The filters 27 and 27a allow gas to flow through them from top to the bottom. Boxes 28 and 28a are detachably placed in the lower box 2b and filled with, for example, an absorption deodorant material such as active charcoal (preferably, bamboo charcoal) and activated clay. The two filters 27 and 27a are disposed in a step-like configuration so that the filter at the downstream side is positioned higher than the one at the upstream side.

A communicating opening 31 is formed at the downstream side of the absorption deodorizing section 26. A connecting opening 32 corresponding to a communicating opening 31 is formed in the lower portion of the inner face of the side box 2c, with the side box 2c connected to it. An exhaust opening 30 is formed in the outer face at the lower portion of the side box 2c, with the HEPA filter 29 located inside the side box 2c. The HEPA filter 29 combines a planar nonwoven cloth with a nonwoven cloth folded in a zigzag shape at the downstream side.

Smoke sucked by the fan 25 into the flow path section 3 (suction flow path 9) through the suction holes 11, 11a, ..., flows into the flow path section 3a in the intermediate box 2a through the communicating opening 16 and the connecting opening 17. Fat is removed from the smoke as it passes through the fat/oil filtering section 19. The smoke is then sent into the flow path section 3b in the lower box 2b by the fan 25 through the communicating opening 23 and the connecting opening 24, where fine particles and odor ingredients are removed in the absorption deodorizing section 26. The smoke is sent into the flow path section 3c in the side box 2c through the communicating opening 31 and the connecting opening 32, and there the fat and oil, fine particles, odor ingredients, and the like are finally removed while passing through the HEPA filter 29. A part of the exhaust gas, which has been almost completely cleaned, is then finally discharged to the outside through the exhaust opening 30.

As shown in FIG. 3, a supplying opening 33 communicating with the inside of the upper box 2 is formed in the upper portion of the side box 2c. A part of the cleaned exhaust gas is supplied to the flow path section 3d in the upper box 2 through the supplying opening 33. Exhaust gas supplied to the flow path section 3d is discharged through a second exhaust opening 34, which is formed at the other side of the upper box 2. By employing such structures, the exhaust heat from the cooker can be dispersed to plural points.

A part of the exhaust gas supplied to the flow path section 3d is supplied to the burner 12 side and mixed with fuel gas that is burnt by the burner 12 in the flow path section 3d. Since the inside of the flow path section 3d is placed in a state of compression by the exhaust gas entering through the supplying opening 33, the combustion by the gas burner 12 may be influenced. To alleviate this excess pressure can be discharged through the second exhaust opening 34 formed in the upper box 2, thereby minimizing the influence on the gas combustion. As is also shown in FIG. 3, an air intake port C of the gas burner 12 is disposed away from the sidewall of the upper box 2 (in FIG. 3, the sidewall shown at the left end), and a damper chamber B is thereby formed. Owing to the damper chamber B, the changing pressure can be made uniform, and thus the influence on the combustion of the fuel gas can be reduced to the minimum.

Also, since the amount of exhaust gas entering through the supplying opening 33 is not always constant, the amount of exhaust gas entering through the supplying opening 33 may not fully satisfy the amount required for combusting the fuel gas. In this case, external air is drawn through the second exhaust opening 34, and imperfect combustion of the fuel gas can thereby be prevented. Ordinarily, cleaned exhaust gas is discharged from the second exhaust opening 34. There is therefore little possibility that the second exhaust opening 34 will become clogged with dust or the like. Accordingly, even when the external air is drawn through the second exhaust opening 34, such problems as imperfect combustion due to the opening portion being clogged with dust or the like can be prevented.

Further, since the cleaned exhaust gas is originally drawn from the vicinity of the roasting surface, there is a possibility that the air will contain insufficient oxygen. In this case, since fresh air can be drawn through the exhaust opening 30, imperfect combustion can be prevented. Note that since the fresh air is drawn along with the roasting smoke and oily smoke through the suction hole 11, even in the cleaned exhaust gas the density of oxygen necessary for combusting the fuel gas completely can be ensured.

In the cooker in accordance with this second embodiment, the air supplied for combustion is preferably approximately 50% of total amount of the exhaust gas. Note that the amount of the exhaust gas supplied into the upper box 2 with respect to the total exhaust gas can be controlled by adjusting the opening area of the exhaust opening 30 provided to the side box 2c.

Further note that, by sending a part of the cleaned exhaust gas into the upper box 2 as described above, the outer face of the outer box 5 disposed in the upper box 2 can be cooled, and thus the temperature of the side wall of the upper box 2 can be prevented from rising unduly.

To facilitate recycling of materials, each of the boxes 2, 2a, ..., may be made of metal. The box body with an open front face and the cover attached to the outside of the box body may be made of a plastic. To facilitate recycling when disassembling the boxes, a plastic cover may be detachably attached to the box body.

The operation and effects of employing the separable structure for the separable smokeless cooker in this second embodiment will now be described.

The separable smokeless cooker in accordance with this embodiment can be separated into one table 1 and four boxes 2, 2a, 2b, and 2c. The cooker can therefore be stored and carried in a disassembled state, and can be assembled after it has been carried to its installation site. The separable smokeless cooker is thus easy to move and handle.

The separable smokeless cooker includes the table 1 and the plurality of boxes 2, 2a, ..., located below the table 1. These can be assembled and disassembled. The flow path sections 3, 3a, ..., are formed inside the boxes. Connecting the neighboring flow path sections 3, 3a, ..., forms the gas-discharge flow path 4. Even though the table 1 and the plurality of boxes 2, 2a, ..., are structured to be disassembled, the gas-discharge flow path 4 can be ensured when the elements are assembled together.

The inner box 8 with its open upper portion is positioned in the upper opening section 7 of the outer box 5 provided in the upper box 2 immediately below the table 1. The installed cooking means 14 is located inside the inner box 8, and the suction flow path is formed outside the inner box 8. The suction holes 11, 11a, ..., are formed in the inner wall of the suction flow path 9. The fat/oil filtering section 19, the fan 25, the absorption deodorizing section 26, and the HEPA filter 29 are disposed in that order in the gas-discharge flow path 4. Since only the component parts have to be assembled to the small size boxes 2, 2a, ..., the assembly work in the manufacturing process can be simplified. Repair work can also be easily carried out by disassembling the separable smokeless cooker into the boxes 2, 2a, .... Where a repair is impossible the table 1 alone or a single one of the boxes 2, 2a, ..., can be replaced with a new one.

Further, since the table 1 and each of the boxes 2, 2a, ..., are packaged separately, the package can be made compactly and thus can be handled easily in transport and storage. In particular, the table 1, which has a large planar area, can be stored vertically. Owing to this, dead space during transporting and storing can be minimized. Thus, limited space can be efficiently utilized which results in a reduction of distribution costs.

Furthermore, the component parts separably disposed below the table 1 can be stored inside the containers for their respective boxes. Owing to this, since the dead space can be reduced, the separable overall smokeless cooker can be entirely packaged compactly.

In the embodiment described just above, three of the four boxes 2, 2a, ..., are stacked together with the fourth located beside those three boxes 2, 2a, and 2b. The fat/oil filtering section 19 is located in the flow path section 3a in the intermediate box 2a. The fan 25 is located at the upstream side in the flow path section 3b in the lower box 2b, with the absorption deodorizing section 26 located at the downstream side. The HEPA filter 29 is located inside the side box 2c, with the exhaust opening 30 formed in the side face of the side box 2c. Owing to this arrangement, since a relatively long gas-discharge flow path can be ensured in the separable smokeless cooker, the pressure is largely reduced and the blow out is also softened. Still further, the exhaust gas can be blown out through almost the entire face of the side box 2c, which is disposed at the flow path along the shorter edge of the table 1. Owing to this, the exhaust gas can be prevented from blowing out strongly at the feet of the guests.

The plurality of filters 27 and 27a, which allow the air to flow in the vertical direction, are provided in parallel with each other in the flow direction in the absorption deodorizing section 26. Absorption deodorizing materials that can be further used can be left as they are in the filters 27 and 27a; only the absorption deodorizing materials that can not used any longer have to be replaced with new ones. Thus, the amount of the deodorizing materials to be replaced at any given replacement can be reduced. Note that by previously preparing a necessary amount of absorption deodorizing materials as a pack using a cloth with good air permeability, the absorption deodorizing materials can be replaced with new ones as a pack and thus the maintenance performance can be increased.

The plurality of filters 27 and 27a is configured so that the filters are located at a higher position toward the downstream side. Large and heavy particles in the smoke are thus absorbed preferentially by the filters located at the nearer position in the filters 27 and 27a, while small and light particles are absorbed by the filters 27 and 27a located at the farther position. Therefore, even when the frequency of replacement of the filters 27 and 27a located at the farther position is reduced and only the filters 27 and 27a located at the nearer position are more frequently replaced, satisfactory absorption deodorizing performance can be maintained. This becomes a significant effect in actual application of the separable smokeless cooker in this embodiment.

Figure 5:
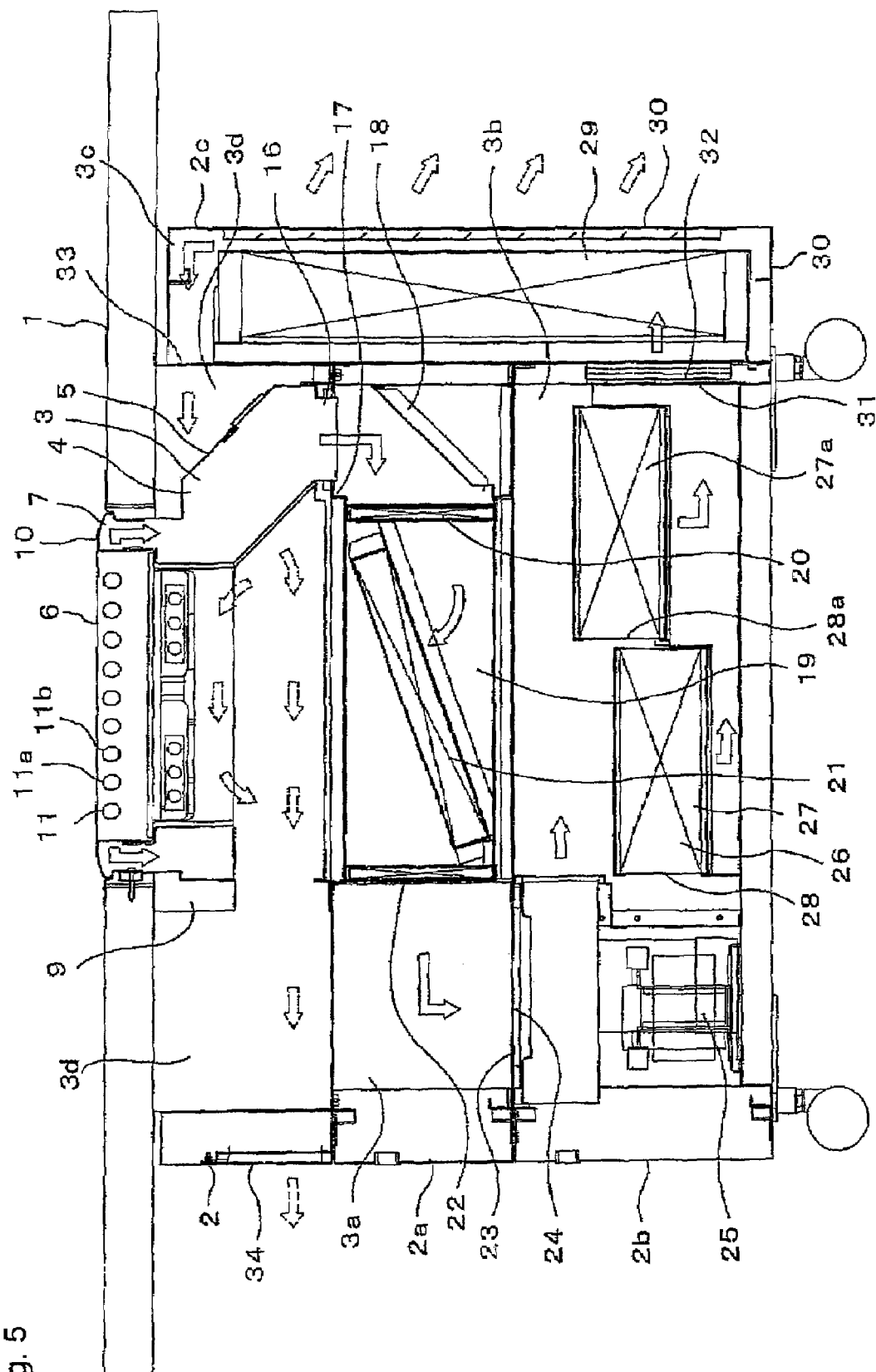
FIG. 5 is a view showing the interior of a separable smokeless cooker in accordance with another embodiment.

FIG. 5 is a sectional view schematically illustrating a separable smokeless cooker in accordance with another example embodiment.

The separable smokeless cooker in accordance with this embodiment employs an IH heater as the installed cooking means. The rest of the construction is the same as that of the prior embodiment. Therefore, only the construction, working, and effects that are unique to this embodiment will be described. As for the points common to the prior embodiment, the description of those will be omitted.

The separable smokeless cooker in accordance with the embodiment 3 is characterized in that the IH heater is employed as the heat source. The IH heater generates heat by induction heating of an iron plate. In a gas heater or the like, radiant heat and heat convection utilizing far infrared radiation are used. An IH heater uses a heat input amount and a heating temperature with respect to the cooked object that are low in comparison with gas heating or the like. It is thus known that roasting a meat using an IH heater generates less oil smoke in comparison with a gas flame. This is because no flame is present to burn meat juices generated from the heated meat.

In other words, the separable smokeless cooker in accordance with this embodiment can reduce the generation of oily smoke. The load on the filters and the active charcoal in the deodorizing unit are thereby reduced. Accordingly, the replacement cycle of the consumable parts can be extended, which yields a reduced operating cost arising from the use of the separable smokeless cooker.

As with the separable smokeless cooker of the prior embodiment, the separable smokeless cooker of this embodiment includes a supplying opening 33 formed in the upper portion of the side box 2c and in communication with the inside of the upper box 2, as is shown in FIG. 5. A part of the cleaned exhaust gas is thus supplied into the upper box 2 through the supplying opening 33. A part of the exhaust gas is supplied into the upper box 2 from outside of the outer box 5 flows below the IH heater and is discharged to the outside through the second exhaust opening 34 formed at the opposite side of the upper box 2. According to the above structure, the heat generated by the electromagnetic induction coil in the IH heater and discharged through a cooling fan can be efficiently discharged to the outside. The load on the IH heater can thereby be reduced and thus the durability of the separable smokeless cooker itself can be increased. By sending a part of the cleaned exhaust gas to the inside of the upper box 2 as described above, the outer face of the outer box 5 disposed in the upper box 2 can be cooled down, and thus the temperature of the sidewall of the upper box 2 can be prevented from rising.

The separable smokeless cooker in accordance with this embodiment may be supplied initially without an IH heater, and an IH heater from the market may be installed in the unit later.

In the cooker in accordance with this embodiment, the air supplied for combustion is preferably approximately 10% to 30% or so of the total amount of the discharge gas.

Figure 6:
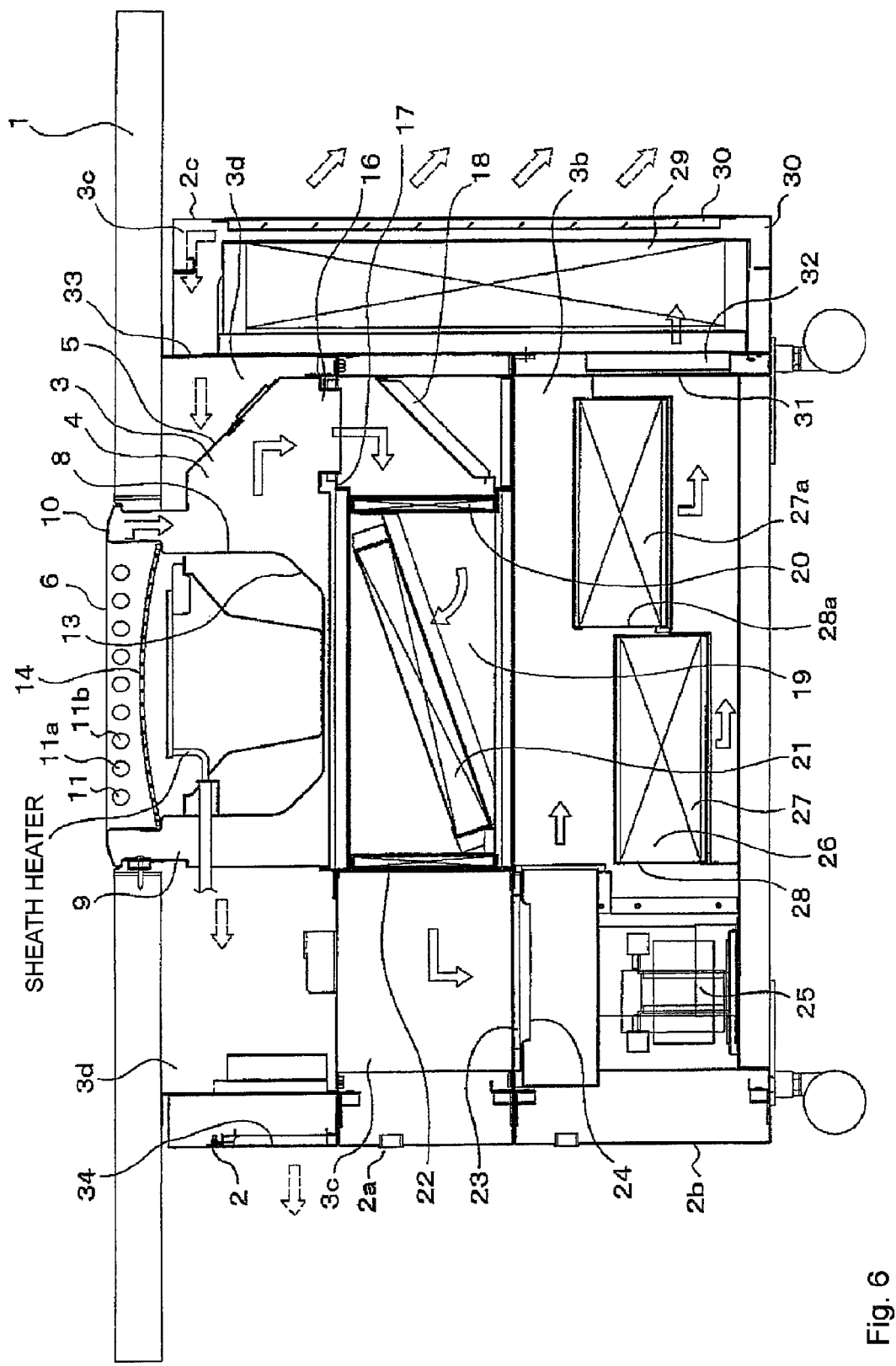
FIG. 6 is a view showing the interior of a separable smokeless cooker incorporated with a sheath heater (a heater that uses a resistive element) within the upper box of the cooker assembly.

The above-described embodiments include examples in which a gas flame or an IH heater is used as a heat source, but the invention is not particularly limited to such constructions. For example, the upper box 2 may be provided with a sheath heater (an electric heater that uses a resistive element) and stacked with the other boxes as shown in FIG. 6. When a heat source as described above is employed and a construction is adopted such that a part of the exhaust gas is sent to the upper box 2, the outer face of the outer box 5 can be cooled down by the exhaust gas within the flow path section 3d, and thus the temperature of the side wall of the upper box 2 can be prevented from rising.

As for the heat source, in addition to the above-described examples, a halogen heater, a portable gas burner, a hot plate, or a portable clay stove containing a charcoal fire may be supplied with the upper box 2, or such may be provided later.

When a portable clay stove containing a charcoal fire is used as a heat source, the cleaned exhaust gas supplied through the supplying opening 33 is supplied through an air intake port in the side wall of the portable clay charcoal stove. In this case the air may preferably be fanned so that the charcoal can be burnt efficiently.

By employing many common parts for the boxes 2, 2a, . . . , by combining various boxes, a lot of variations such as shape (rectangular type or round type) of the grill section and type of the heat source can be selected corresponding to the various needs of the users.

Further, by changing the constitution of the table 1, a separable smokeless cooker in accordance with the invention may be used as a smokeless fryer or a wagon equipped with a cooking means. When using the separable smokeless cooker as a wagon, in order to improve the freedom of the cooking means, no cooking means is provided beforehand as shown in FIG. 7(a), but a placement table on which a cooking means as a portable separate member is placed thereon may be provided. In this case, the suction hole communicating with the suction flow path should be disposed at a position higher than the roasting surface of the placed cooking means. A wagon as shown in FIG. 7(b) is equipped with a retractable hood, and thereby the roasting smoke and oily smoke rising from the roasting surface of the cooking means can be drawn more efficiently into the unit. In the wagon shown in FIGS. 7(a) and 7(b), in order to ensure the installation space for the cooking means (placement table), as shown in FIG. 7(b), the suction hole 11 for sucking the roasting smoke and oily smoke is formed in a groove shape behind the cooking means, and is communicated with the intermediate box 2a through the flow path section 3. The basic structure other than the above is the same as the above-described embodiments.

As described above, by changing the heating section, various cooking methods can be selected. Thus, a so-called multi-purpose smokeless cooker and multi-purpose smokeless wagon can be provided.

What is claimed is:

1. A separable smokeless cooker, comprising:
   a table; and
   a plurality of boxes assembled together below the table;
   wherein said plurality of boxes includes an upper box, an intermediate box, and a lower box which are vertically stacked, and a side box which is disposed adjacent to the vertically stacked upper, intermediate, and lower boxes, wherein the side box is taller than it is wide;
   wherein an inside of each of the upper, intermediate, and lower boxes is arranged as a flow path section, wherein an inside of the side box is arranged as a vertical flow path section, and wherein neighboring flow path sections are connected to each other to form a gas-discharge flow path;
   wherein, in an upper opening section of an outer box provided in the upper box immediately below the table, an inner box having an open upper portion is formed, and within the inner box, a placement table is provided that is adapted to receive a separate cooking appliance;
   wherein a suction flow path serving as a flow path section of the upper box is formed between the inner box and the outer box;
   wherein a suction hole communicating with the suction flow path is formed above a heating surface of the cooking appliance placed on the placement table;
   wherein a flow path section of the intermediate box, having a first end and a second end, is horizontally elongated, communicates with the suction flow path of the upper box via a first connecting opening located above the first end of the flow path section, and communicates with the flow path section of the lower box via a second connecting opening located below the second end of the flow path section;
   wherein a flow path section of the lower box, having a first end and a second end, is horizontally elongated, communicates with the flow path section of the intermediate box via the second connecting opening located above the first end of the flow path section, and communicates with the lower end portion of the flow path section of the side box via a third connecting opening located at the second end of the flow path section;
   wherein a fat/oil filtering section is provided in the flow path section of the intermediate box;
   wherein a fan is provided at an upstream side of the flow path section of the lower box, and wherein an absorption deodorizing section is provided at a downstream side of the flow path section of the lower box;
   wherein a HEPA filter is provided in the flow path section of the side box; and
   wherein an exhaust opening is formed in a side face of the side box, so as to discharge at least a part of exhaust gases to an outside of the smokeless cooker through the exhaust opening, said exhaust gases being cleaned by passing through the fat/oil filtering section, the absorption deodorizing section, and the HEPA filter.

2. The separable smokeless cooker according to claim 1, wherein the separate cooking appliance is a gas burner.

3. The separable smokeless cooker according to claim 1, wherein the separate cooking appliance is a heating element.

4. The separable smokeless cooker according to claim 1, wherein the separate cooking appliance is an electric heater that includes a resistive element.

5. A separable smokeless cooker comprising:
   a table; and
   a plurality of boxes assembled together below the table;
   wherein said plurality of boxes includes an upper box, an intermediate box, and a lower box which are vertically stacked, and a side box which is disposed adjacent to the vertically stacked upper, intermediate, and lower boxes and is taller than it is wide;
   wherein an inside of each of the upper, intermediate, and lower boxes is arranged as a flow path section, wherein an inside of the side box is arranged as a vertical flow path section, and wherein neighboring flow path sections are connected to each other to form a gas-discharge flow path;
   wherein, in an upper opening section of an outer box provided in the upper box immediately below the table, an inner box having an open upper portion is formed, and wherein an installed cooking appliance is provided within the inner box;
   wherein a suction flow path serving as a flow path section of the upper box is formed between the inner box and the outer box; and wherein a suction hole communicating with the suction flow path is formed above a heating surface of the installed cooking appliance;
   wherein a flow path section of the intermediate box, having a first end and a second end, is horizontally elongated, communicates with the suction flow path of the upper box via a first connecting opening located above the first end of the flow path section, and communicates with the flow path section of the lower box via a second connecting opening located below the second end of the flow path section;
   wherein a flow path section of the lower box, having a first end and a second end, is horizontally elongated, communicates with the flow path section of the intermediate box via the second connecting opening located above the first end of the flow path section, and communicates with the lower end portion of the flow path section of the side box via a third connecting opening located at the second end of the flow path section;

wherein a fat/oil filtering section is provided in the flow path section of the intermediate box;

wherein a fan is provided at an upstream side of the flow path section of the lower box, and wherein an absorption deodorizing section is provided at a downstream side of the flow path section of the lower box;

wherein a HEPA filter is provided in the flow path section of the side box; and wherein an exhaust opening is formed in a side face of the side box, so as to discharge at least a part of exhaust gases to an outside of the smokeless cooker through the exhaust opening, said exhaust gases being cleaned by passing through the fat/oil filtering section, the absorption deodorizing section and the HEPA filter.

6. The separable smokeless cooker according to claim 5, wherein the installed cooking appliance is a gas burner.

7. The separable smokeless cooker according to claim 5, wherein the installed cooking appliance is an electric heater using a resistive element.

8. The separable smokeless cooker according to claim 5, wherein the fat/oil filtering section includes a first filter and a second filter.

9. The separable smokeless cooker according to claim 5, wherein the installed cooking appliance is a heating element.

10. A separable smokeless cooker comprising:
a table; and
a plurality of boxes assembled below the table;
wherein said plurality of boxes includes an upper box, an intermediate box, and a lower box which are vertically stacked, and a side box which is disposed adjacent to the vertically stacked upper, intermediate, and lower boxes and is taller than it is wide;
wherein an inside of each of the upper, intermediate, and lower boxes is arranged as a flow path section, wherein an inside of the side box is arranged as a vertical flow path section, and wherein neighboring flow path sections are connected to each other to form a gas-discharge flow path;
wherein an inner box having an open upper portion is formed in an upper opening section of an outer box provided in the upper box immediately below the table, an installed cooking appliance is provided within the inner box, a suction flow path is formed outside the inner box, and a suction hole communicating with the suction flow path is formed above a heating surface of the installed cooking appliance;
wherein a flow path section of the intermediate box, having a first end and a second end is horizontally elongated, communicates with the suction flow path of the upper box via a first connecting opening located above the first end of the flow path section, and communicates with the flow path section of the lower box via a second connecting opening located below the second end of the flow path section;
wherein a flow path section of the lower box, having a first end and a second end, is horizontally elongated, communicates with the flow path section of the intermediate box via the second connecting opening located above the first end of the flow path section, and communicates with the lower end portion of the flow path section of the side box via a third connecting opening located at the second end side of the flow path section;
wherein a fat/oil filtering section is provided in the flow path section of the intermediate box;
wherein a fan is provided at an upstream side of the flow path section of the lower box, and wherein an absorption deodorizing section is provided at a downstream side of the flow path section of the lower box;
wherein a HEPA filter is provided in the flow path section of the side box;
wherein an exhaust opening is formed in a side face of the side box, so as to discharge a part of exhaust gases to an outside of the smokeless cooker through the exhaust opening, said exhaust gases being cleaned by passing through the fat/oil filtering section, the absorption deodorizing section and the HEPA filter; and
wherein a supply port for communicating the flow path section of the side box with an inside of the upper box is formed at an upper portion of the side box, so as to allow the remainder of said cleaned exhaust gases to be provided below and/or around the installed cooking appliance through the supply port.

11. The separable smokeless cooker according to claim 10, wherein the installed cooking appliance is a gas burner, and wherein a part of exhaust gas sent through the supply port is used for burning fuel gas with the gas burner.

12. The separable smokeless cooker according to claim 10, wherein the installed cooking appliance includes a heating element, and wherein a part of exhaust gas sent through the supply port cools the heating element.

13. The separable smokeless cooker according to claim 10, wherein the installed cooking appliance is an electric heater using a resistive element, and
wherein a part of the exhaust gas sent through the supply port cools down the outer wall of the outer box in the upper box.

14. The separable smokeless cooker according to claim 10, wherein the fat/oil filtering section includes a first filter and a second filter.

15. The separable smokeless cooker according to claim 14, wherein the second filter exhibits a collection ratio of 95% or more.

* * * * *